(12) United States Patent
Olszowy

(10) Patent No.: US 9,803,761 B1
(45) Date of Patent: Oct. 31, 2017

(54) FLAPPER CHECK VALVE BUMPER

(71) Applicant: HS Wroclaw Sp. Z.o.o., Wroclaw (PL)

(72) Inventor: Blazej Olszowy, Wroclaw (PL)

(73) Assignee: HS Wroclaw Sp. Z.o.o., Wroclaw (PL)

( * ) Notice: Subject to any disclaimer, the term of this patent is extended or adjusted under 35 U.S.C. 154(b) by 0 days.

(21) Appl. No.: 15/096,841

(22) Filed: Apr. 12, 2016

(51) Int. Cl.
*F16K 15/03* (2006.01)
*G05D 7/01* (2006.01)

(52) U.S. Cl.
CPC ............ *F16K 15/03* (2013.01); *F16K 15/038* (2013.01); *G05D 7/0173* (2013.01)

(58) Field of Classification Search
CPC ................................. F16K 5/03; F16K 15/038
USPC ..................... 137/512, 512.1, 527
See application file for complete search history.

(56) References Cited

U.S. PATENT DOCUMENTS

| 1,147,292 | A | 7/1915 | Benson et al. |
| 4,079,751 | A | 3/1978 | Partridge et al. |
| 4,230,148 | A | 10/1980 | Ogle, Jr. |
| 4,867,199 | A | 9/1989 | Marx |
| 4,942,898 | A | 7/1990 | Osowski |
| 5,246,032 | A | 9/1993 | Muddiman |
| 5,392,810 | A | 2/1995 | Cooper et al. |
| 7,422,029 | B2 | 9/2008 | Denike et al. |
| 7,568,498 | B2 * | 8/2009 | Denike ................. F16K 15/038 137/512.1 |
| 2008/0053536 | A1 | 3/2008 | Denike et al. |
| 2008/0078458 | A1 * | 4/2008 | Denike ................. B64D 13/02 137/512.1 |
| 2015/0267824 | A1 | 9/2015 | Feng et al. |

FOREIGN PATENT DOCUMENTS

| DE | 202006004839 U1 | 6/2006 |
| EP | 0361731 A2 | 9/1989 |
| EP | 2249068 A2 | 11/2010 |
| FR | 2930617 A1 | 10/2009 |

OTHER PUBLICATIONS

Extended European Search Report for EP Application No. 17166112.7, dated Aug. 17, 2017, 9 pages.

* cited by examiner

*Primary Examiner* — Craig Schneider
*Assistant Examiner* — P. Macade Nichols
(74) *Attorney, Agent, or Firm* — Kinney & Lange, P.A.

(57) ABSTRACT

A check valve includes a housing, a flap, a hinge, at least one post, and at least one tubular bumper. The hinge allows the flap to rotate relative to the housing between a fully open position and a closed position. The at least one post is disposed at or near the periphery of the housing supporting the hinge and extending axially relative to the housing from the housing. The at least one tubular bumper is movable with the flap and configured to contact the at least one post when the flap pivots to the fully open position.

19 Claims, 3 Drawing Sheets

FLAPPER CHECK VALVE BUMPER

BACKGROUND

The present invention relates generally to fluid flow valves, and more particularly to flapper check valves.

Check valves are used to facilitate mono-directional flow in fluid systems. Check valves are used in a variety of applications, such as water, air, and refrigeration handling systems. During operation, a check valve opens when pressure differential across the valve in the flow direction exceeds a cracking pressure. When differential pressure across the check valve drops sufficiently, or changes directions, the check valve closes. Check valves can take a variety of forms, including diaphragm, ball, duckbill, and swing valves. Some check valves have apertures covered, in a closed state, by hinged flappers that can only open in one direction (i.e. in a fluid flow direction). Such check valves typically include stop pins that halt opening of the flappers at a predetermined maximum angle.

The flappers of flapper-based check valves can be damaged by repeated impact against stop pins. This damage can, for instance, take the form of cracking or deformation, and reduces part lifetimes.

SUMMARY

In one aspect, a check valve includes a housing, a flap, a hinge, at least one post, and at least one tubular bumper. The hinge allows the flap to rotate relative to the housing between a fully open position and a closed position. The at least one post is disposed at or near the periphery of the housing supporting the hinge and extending axially relative to the housing from the housing. The at least one tubular bumper is movable with the flap and configured to contact the at least one post when the flap pivots to the fully open position.

In another aspect, a method of operating a check valve includes rotating a flap about a hinge and relative to a check valve housing in response to a fluid flow. At least one tubular bumper movable with the flap contacts at least one post, that supports the hinge, to stop rotation of the flap.

The present summary is provided only by way of example, and not limitation. Other aspects of the present invention will be appreciated in view of the entirety of the present disclosure, including the entire text, claims and accompanying figures.

Figure 1:
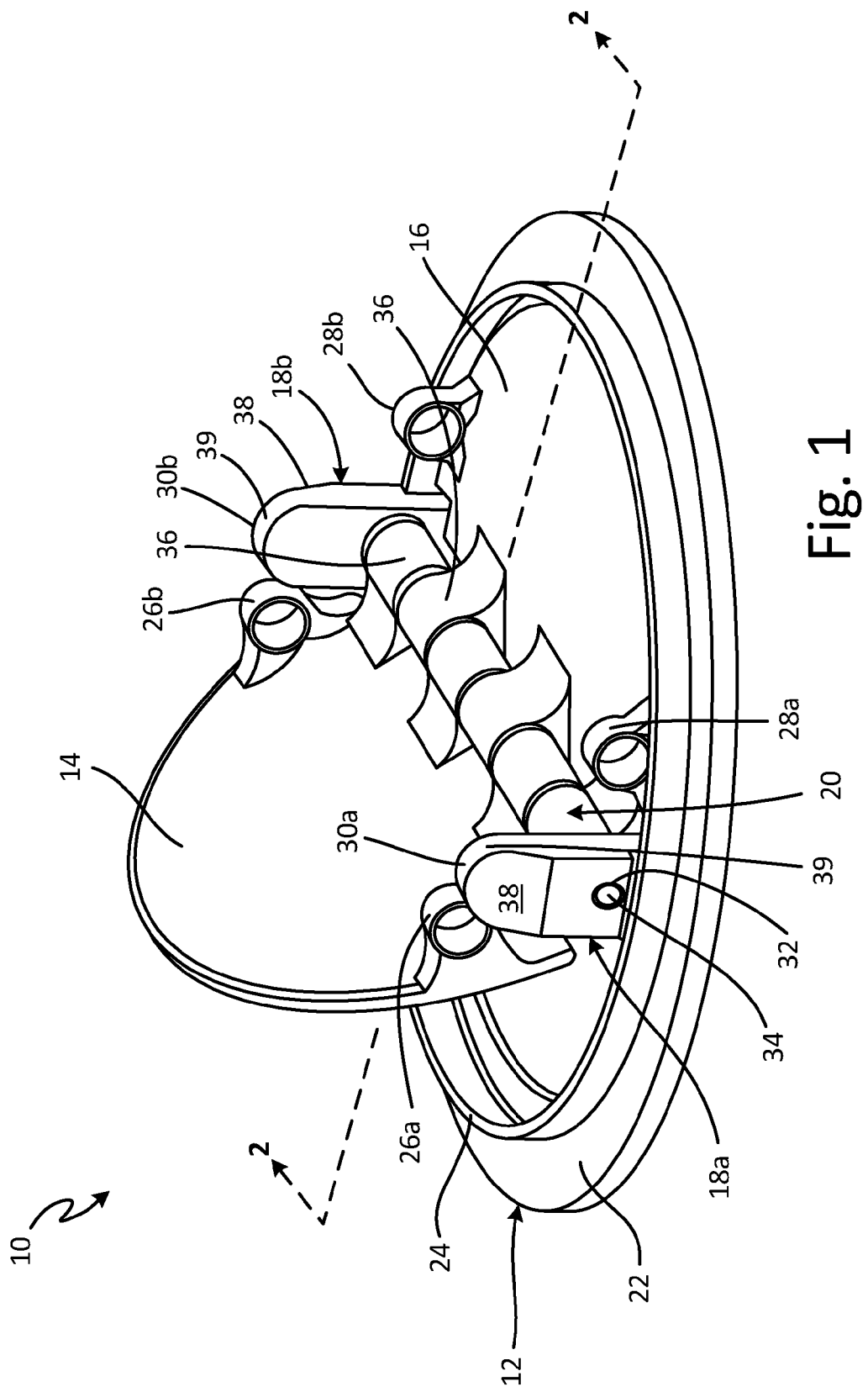
FIG. 1 is a perspective view of an embodiment of a flapper check valve.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Flapper check valves used in air cycle machines of aircraft (or in other applications) are prone to failure over time from shock forces transmitted to the flaps when the flaps quickly open during normal operation. The present invention helps to prolong the life of the flaps by including a tubular bumper that contacts a post upon opening the flap, where the tubular bumper absorbs and dissipates forces.

Figure 2:
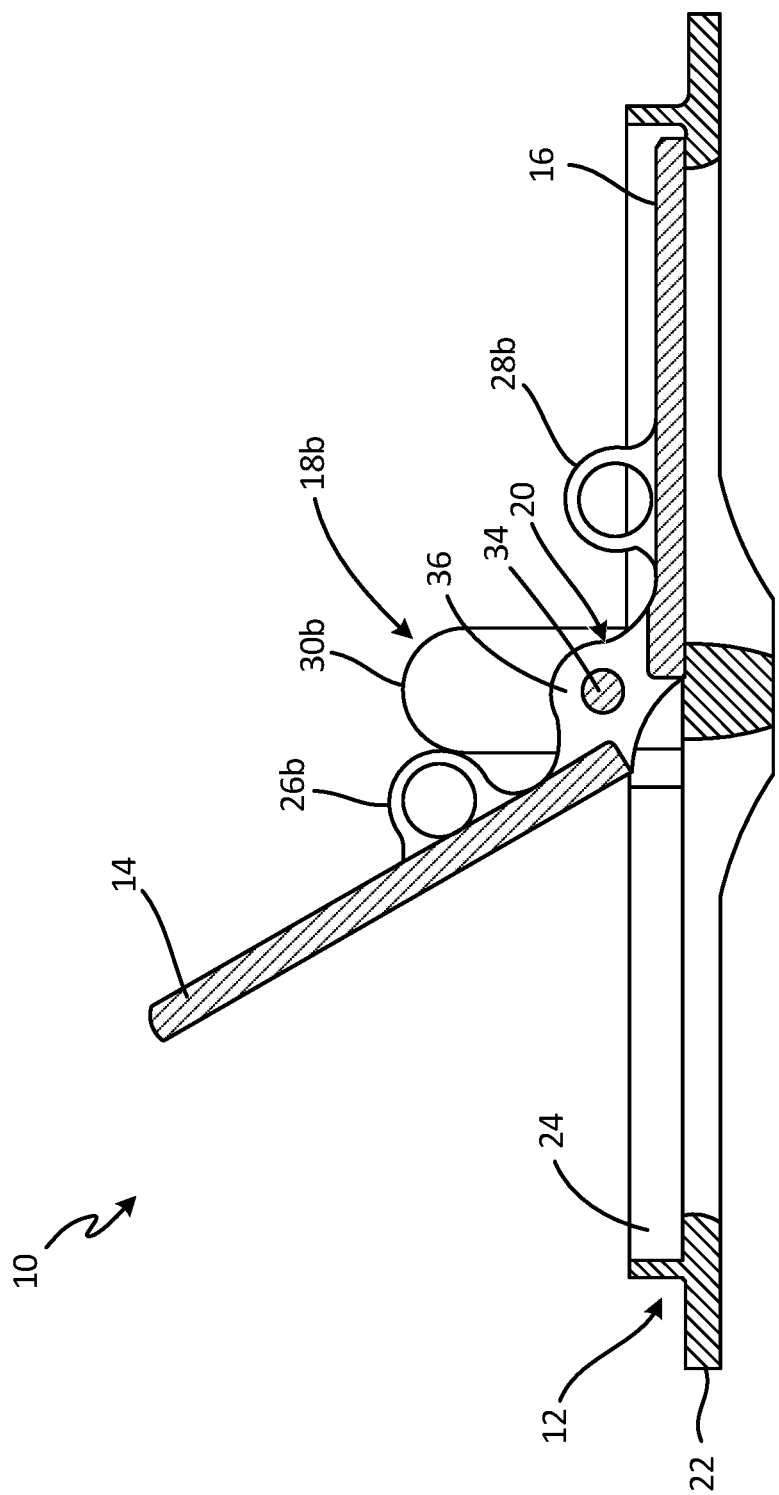
FIG. 2 is a cross-sectional view of the flapper check valve taken along line 2-2 of FIG. 1

FIG. 1 is a perspective view of an embodiment of check valve 10 and FIG. 2 is a cross-sectional view of check valve 10 taken along line 2-2 of FIG. 1. Check valve 10 includes housing 12, first flap 14, second flap 16, posts 18a and 18b, and hinge assembly 20. Housing 12 includes flange 22 and wall 24. First flap 14 includes tubular bumpers 26a and 26b, and second flap 16 includes tubular bumpers 28a and 28b. Posts 18a and 18b include ends 30a and 30b, respectively, and bores 32 (only one bore 32 is visible in FIG. 1 and neither of bores 32 are visible in FIG. 2). Hinge assembly 20 includes hinge pin 34, and hinge barrels 36. End 30a includes bevel 38 and rounded surface 39.

In the illustrated embodiment, housing 12 is a ring housing that carries and supports the components of check valve 10, and defines a periphery of check valve 10. Flange 22 of housing 12 can be a cylindrical ring having a thickness (or height) that is small relative to a diameter of housing 12. Housing 12 also includes wall 24, which is an annular wall perpendicularly connected to flange 22 between radially inner circumference and radially outer circumference of flange 22. Wall 24 extends axially from a radial surface of flange 22. Though check valve 10 is shown and described as annular, check valve 10 can be produced in other geometric shapes, for example rectangular. Also, check valve 10 can be produced to have components with varying geometries. For example, flange 22 can be of a geometric shape that is different than wall 24 (e.g. flange 22 can be rectangular and wall 24 can be circular).

Posts 18a and 18b are attached to housing 12 at a radially inner surface of wall 24, and extend axially from housing 12, past wall 24, and terminate at ends 30a and 30b, respectively, causing posts 18a and 18b to be cantilevered from housing 12. Posts 18a and 18b are also mounted to a radial surface of flange 22. Though posts 18a and 18b are shown and described as mounting to an axial inner surface of wall 24 and a radial surface of flange 22, posts 18a and 18b can be connected to housing 12 at other locations. Ends 30a and 30b include outward-facing bevels 38, and rounded surfaces 39 located adjacent to each bevel 38. Curvature of rounded surfaces 39 can be in a direction substantially perpendicular to a direction in which bevels 38 are angled. Bores 32 pass through posts 18a and 18b, respectively, in diametric alignment relative to housing 12, and axial alignment relative to each other.

First flap 14 and second flap 16 are thin plates each having a small thickness relative to the diameter of first flap 14 and second flap 16. First flap 14 and second flap 16 have an outer circumference that is slightly larger than the inner circumference of flange 22, but slightly smaller than the circumference of wall 24, so that first flap 14 and second flap 16 are disposed within wall 24 of housing 12, but overlap flange 22 when closed to provide a seal. In further embodiments, check valve 10 can include only a single flap, such as first flap 14, that rotates in response to fluid pressure.

First flap 14 and second flap 16 mesh together at hinge barrels 36 to form hinge assembly 20, which spans across a diameter of first flap 14 and second flap 16, terminating between posts 18a and 18b. Hinge pin 34 extends across a diameter of housing 12, passing through hinge barrels 36, and terminating inside (or beyond) bores 32 of posts 18a and 18b, which support hinge pin 34. In further embodiments, a single post can be used to support hinge pin 34.

Tubular bumpers 26a and 26b are carried by (and movable with) first flap 14 and tubular bumpers 28a and 28b are carried by (and movable with) second flap 16. Tubular bumpers 26a and 26b are each disposed at or near a periphery of first flap 14, and spaced apart from each other. Tubular bumpers 28a and 28b are each disposed at or near a periphery of second flap 16, and spaced apart from each other. Tubular bumpers 26a and 28a are disposed near post 18a and tubular bumpers 26b and 28b are disposed near post 18b. Each of tubular bumpers 26a, 26b, 28a, and 28b can be formed in a cylindrical shape. In further embodiments, other tubular shapes, such as an elliptical cross-section tube, or a square prism tube. Tubular bumpers 26a and 26b can share a common axis that is parallel to hinge pin 34, and tubular bumpers 28a and 28b can share a common axis that is parallel to hinge pin 34.

Tubular bumpers 26a and 26b connect to first flap 14 at an outer circumference of tubular bumpers 26a and 26b. However, fillets connect tubular bumpers 26a and 26b to first flap 14, so that a significant portion of tubular bumpers 26a and 26b are connected to first flap 14. Tubular bumpers 28a and 28b are similarly connected to second flap 16. Also, each of tubular bumpers 26a, 26b, 28a, and 28b can have a curve on a radially outer side of tubular bumpers 26a, 26b, 28a, and 28b, so that a width of each of tubular bumpers 26a, 26b, 28a, and 28b is larger towards posts 18a and 18b, respectively.

Hinge assembly 20 enables first flap 14 and second flap 16 to rotate about hinge pin 34, within housing 12, between an open position (or a fully open position) and a closed position. As shown in FIG. 1, first flap 14 is in a fully open position and second flap 16 is in a closed position. Though only two positions are shown, first flap 14 and second flap 16 can rotate to positions between open and closed. As first flap 14 and second flap 16 can rotate independently, first flap 14 and second flap 16 can be in the same position (e.g. open), or in different positions, as shown in FIG. 1.

In operation, first flap 14 and second flap 16 can be in the closed position. Because first flap 14 overlaps flange 22, fluid cannot flow through housing 12 and past first flap 14. The same is true for second flap 16. Then, in response to a change in fluid pressure, first flap 14 can rotate to the fully open position at which point tubular bumpers 26a and 26b contact posts 18a and 18b, respectively (as shown in FIG. 1). More specifically, tubular bumper 26a can contact a rounded surface 39 of end 30a and tubular bumper 26b can contact rounded surface 39 of end 30b, which prevents first flap 14 from rotating further. Tubular bumpers 26a and 26b are mounted on flap 14 away from posts 18a and 18b so that when an opening between first flap 14 and housing 12 is created while first flap 14 is in the fully open position, the opening is sufficiently large to allow fluid to flow through housing 12 and past first flap 14.

Upon contacting posts 18a and 18b, respectively, tubular bumpers 26a and 26b will receive a force from posts 18a and 18b, respectively. Tubular bumpers 26a and 26b help disperse the force by flexing (or elastically deforming) and distribute any remaining force to first flap 14. Because of the tubular shape of tubular bumpers 26a and 26b, and manner of connection between tubular bumpers 26a and 26b with first flap 14, tubular bumpers 26a and 26b better distribute the force (or shock) to first flap 14 than bumpers of the prior art. Tubular bumpers 18a and 28b interact similarly with second flap 16 when second flap 16 rotates to the fully open position.

In operation, check valve 10 may undergo many open and closing cycles, transferring repeated force and shock from posts 18a and 18b to bumpers 26a and 26b, which can cause damage to first flap 14. Therefore, improved dissipation and distribution of force by tubular bumpers 26a and 26b can help prevent failure of first flap 14, increasing component life and saving cost.

The tubular shape of tubular bumpers 26a, 26b, 28a, and 28b provide additional benefits. First, because they are tubular with an open passage or cavity, tubular bumpers 26a, 26b, 28a, and 28b do not add significant weight to check valve 10. Also, because the shape of tubular bumpers 26a, 26b, 28a, and 28b is friendly to a casting process, tubular bumpers 26a, 26b, 28a, and 28b do not add significant cost or manufacturing complexity to check valve 10 over the prior art. Further, because tubular bumpers 26a, 26b, 28a, and 28b distribute stress and shock to first flap 14 and second flap 16, first flap 14 and second flap 16 can have a smaller thickness, saving cost and weight.

The components of check valve 10 can be formed of the same material, such as an aluminum alloy, titanium, steel, and the like. The components of check valve 10 can also be formed of non-metallic materials, such as plastics, where applications allow.

Figure 3:
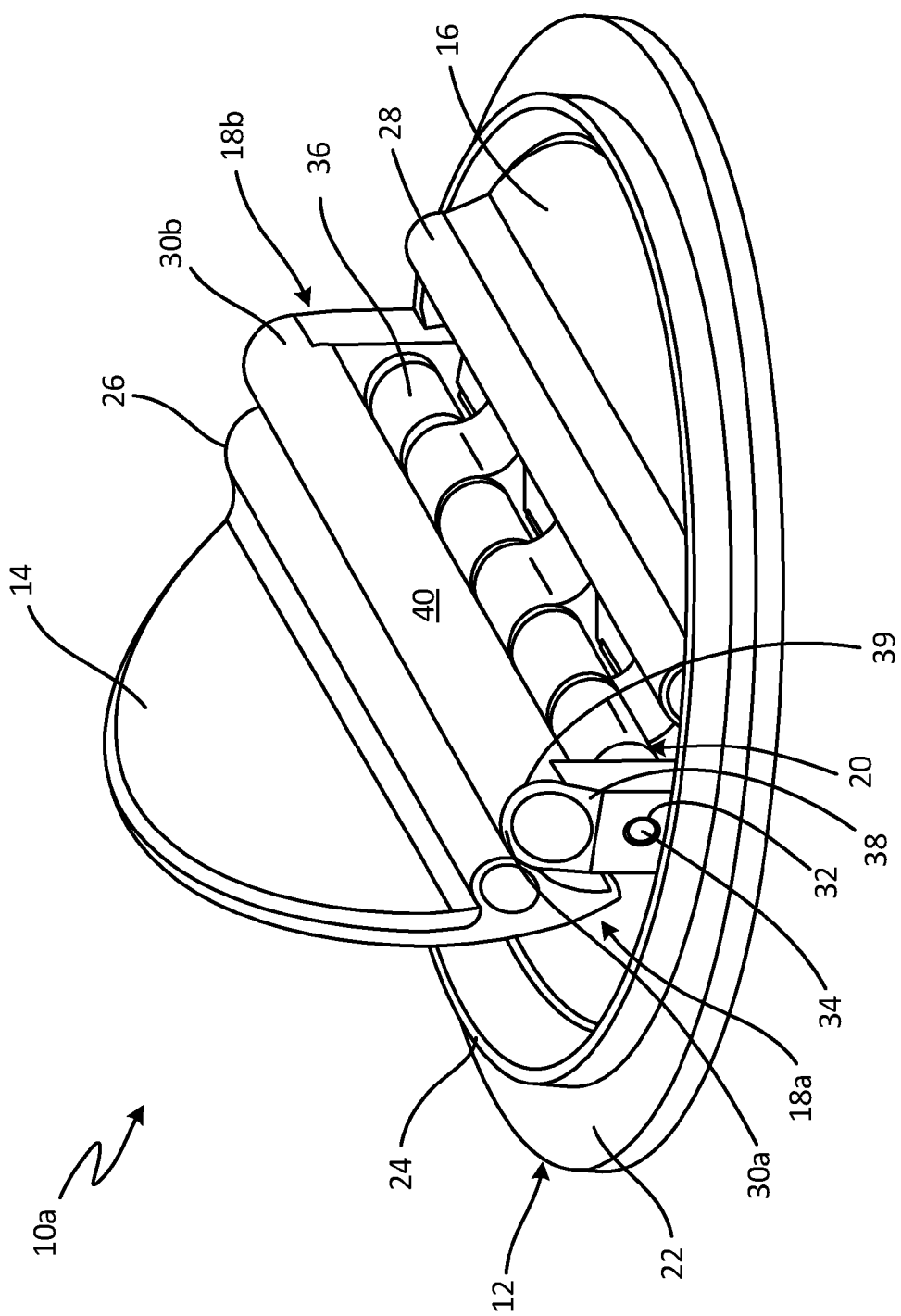
FIG. 3 is a perspective view of another embodiment of a flapper check valve.

Though tubular bumper 26a is shown as spanning about 5 percent of the length of hinge assembly 20, tubular bumper can span 100 percent of this length (as shown in FIG. 3), and can span any length in between. For example, a single tubular bumper can have a length ratio of about 50 percent. However, the benefits obtained from using a longer bumper—such as greater load distribution—must be balanced with the additional weight and therefore cost of producing and operating a longer bumper. Further, when two bumpers are used (as shown in FIG. 1), bumpers having smaller length to hinge assembly ratios must be used to allow both bumpers to contact their respective stop posts. For example, tubular bumper 26a cannot have a length to hinge assembly length ratio higher than 50 percent. In an embodiment including two bumpers, a length ratio of 3 to 50 percent is practical, and a ratio of 5 to 45 percent is preferred.

FIG. 3 is a perspective view of another embodiment of check valve 10a, which includes housing 12, first flap 14, second flap 16, posts 18a and 18b, hinge assembly 20, and stop tube 40. Housing 12 includes flange 22 and wall 24. First flap 14 includes tubular bumper 26, and second flap 16 includes tubular bumper 28. Posts 18a and 18b include ends 30a and 30b, respectively, and bores 32 (only one bore 32 is visible in FIG. 3), respectively. Hinge assembly 20 includes hinge pin 34, and hinge barrels 36. End 30a includes bevel 38 and rounded surface 39.

Housing 12 and hinge assembly 20 are constructed, are connected, and operate similarly to check valve 10 of FIGS. 1 and 2. However, first flap 14, second flap 16, posts 18a and 18b, tubular bumpers 26 and 28 differ from check valve 10 of FIGS. 1 and 2.

Posts 18a and 18b are constructed similarly to posts 18a and 18b of check valve 10 of FIGS. 1 and 2, but differ in that posts 18a and 18b also connect to stop tube 40, which can be a cylindrical stopper that spans between posts 18a and 18b. Stop tube 40 connects to post 18a near end 30a and connects to post 18b near end 30b so that there is a space between hinge assembly 20 and stop tube 40. Though shown as a cylindrical tube, stop tube 40 can be of other shapes, such as a cylinder that is not a tube, a rectangular prism, or other shapes that allow stop tube 40 to function as described herein.

First flap 14 and second flap 16 are similar to first flap 14 and second flap 16 of check valve 10 of FIGS. 1 and 2, but differ in that first flap 14 carries tubular bumper 26, and second flap 16 carries tubular bumper 28. Tubular bumper 26 spans across a chord of first flap 14, and tubular bumper 28 spans across a chord of second flap 16. Each of tubular bumpers 26 and 28 are formed in a cylindrical shape, and each have an axis that is parallel to hinge pin 34. Tubular bumper 26 connects to first flap 14 across the entirety of the chord of first flap 14 that bumper 26 spans. However, fillets connect tubular bumper 26 and first flap 14, so that a significant portion of the circumference tubular bumper 26 is connected to first flap 14. Tubular bumper 28 is similarly connected to second flap 16.

In operation, first flap 14 and second flap 16 can be in a closed position. Then, in response to a change in fluid pressure, first flap 14 can rotate to a fully open position at which point tubular bumper 26 contacts posts 18a and 18b and stop tube 40 (as shown in FIG. 3). More specifically, tubular bumper 26 can contact rounded surface 39 of ends 30a and 30b and a rounded portion of stop tube 40. This contact prevents first flap 14 from rotating further. Tubular bumper 26 is spaced away from posts 18a and 18b so that the opening between first flap 14 and housing 12 when first flap 14 is in the fully open position is sufficiently large to allow fluid to flow through housing 12 and past first flap 14.

Upon contacting posts 18a and 18b and stop tube 40, tubular bumper 26 will receive a force from posts 18a and 18b and stop tube 40. Tubular bumper 26 helps to disperse the force and distributes any remaining force to first flap 14. Because of the tubular shape of tubular bumper 26, and type of connection between tubular bumper 26 and first flap 14, tubular bumper 26 better distributes the force (or shock) to first flap 14 than bumpers of the prior art. Tubular bumper 28 interacts similarly with posts 18a and 18b, stop tube 40, and second flap 16 when second flap 16 rotates to the fully open position.

Because tubular bumper 26 spans an entire chord of first flap 14 and tubular bumper 28 spans an entire chord of second flap 16, tubular bumpers 26 and 28 are larger, relative to first flap 14, and second flap 16. This allows tubular bumpers 26 and 28 to better dissipate shock and forces transmitted from posts 18a and 18b and stop tube 40. In other words, the load is better distributed across tubular bumpers 26 and 28, posts 18a and 18b, and stop tube 40 than in some of the prior art. Also, because stop tube 40 spans the entire diameter of first flap 14 and second flap 16 and because tubular bumper 26 spans an entire chord of first flap 14 and tubular bumper 28 spans an entire chord of second flap 16, shock and force transmitted from stop tube 40 to first flap 14 and second flap 16 will be transmitted to a larger portion of first flap 14 and second flap 16, reducing stress inflections in first flap 14 and second flap 16, further increasing component life.

The components of the embodiment disclosed in FIGS. 1 and 2 can be incorporated into the embodiment disclosed in FIG. 3, and vice versa. For example, tubular bumpers 26 and 28 of check valve 10a of the embodiment of FIG. 3 can be used with posts 18a and 18b of check valve 10 of the embodiment of FIG. 1, and without stop tube 40. Similarly, tubular bumpers 26a, 26b, 28a, and 28b of check valve 10 (of FIGS. 1 and 2) can be used with posts 18a and 18b and stop tube 40 of check valve 10a (of FIG. 3).

Discussion of Possible Embodiments

The following are non-exclusive descriptions of possible embodiments of the present invention.

A check valve includes a housing, a flap, a hinge, at least one post, and at least one tubular bumper. The hinge allows the flap to rotate relative to the housing between a fully open position and a closed position. The at least one post is disposed at or near the periphery of the housing supporting the hinge and extending axially relative to the housing from the housing. The at least one tubular bumper is movable with the flap and configured to contact the at least one post when the flap pivots to the fully open position.

The check valve of the preceding paragraph can optionally include, additionally and/or alternatively, any one or more of the following features, configurations and/or additional components.

A second flap can rotate relative to the housing between a fully open and a closed position.

The flap and the second flap can connect across a diameter of the housing to form the hinge.

The at least one post can be rounded at a location where the at least one tubular bumper contacts the post when the flap is in the fully open position. The at least one tubular bumper can have a cylindrical tubular shape, and the at least one tubular bumper can be configured to flex upon impact with the at least one post.

A second post can be disposed at or near the periphery of the check valve, diametrically opposite the at least one post, extending axially relative to the housing from the housing, and the second post can support the hinge.

A second tubular bumper can be movable with the flap.

The at least one tubular bumper can contact the at least one post and the second tubular bumper can contact the second post when the flap is in the fully open position.

A second flap can connect across a diameter of the housing.

A third tubular bumper can be movable with the second flap and a fourth tubular bumper can be movable with the second flap.

The at least one tubular bumper can contact the at least one post and the second tubular bumper can contact the second post when the flap is in the fully open position, and the third tubular bumper can contact the at least one post and the fourth tubular bumper can contact the second post when the second flap is in the fully open position.

The at least one tubular bumper can extend across a surface of the flap so that the at least one tubular bumper contacts both the first and second post when the flap is in the fully open position.

A second tubular bumper can be attached to the second flap. The second tubular bumper can extend across a surface of the second flap so that the second tubular bumper contacts both the first and second post when the second flap is in the fully open position.

A stop can connect to the at least one post and the second post. The at least one tubular bumper can contact the stop when the flap is in the fully open position.

The stop and the at least one tubular bumper can be configured to distribute load caused by impact between the stop tube and the at least one tubular bumper.

The stop can be tubular.

The at least one tubular bumper can have a length of 5 to 100 percent of a length of the hinge.

The at least one tubular bumper can have a length of 10 to 45 percent of a length of the hinge.

A method of operating a check valve includes rotating a flap about a hinge and relative to a check valve housing in response to a fluid flow. At least one tubular bumper movable with the flap contacts at least one post, that supports the hinge, to stop rotation of the flap.

The method of the preceding paragraph can optionally include, additionally and/or alternatively, any one or more of the following features, configurations, additional components, or steps.

The contact loads can be distributed between the at least one tubular bumper and the at least one post over 5 to 100 percent of a length of the hinge.

The contact loads can be distributed between the at least one tubular bumper and the at least one post over 10 to 45 percent of a length of the hinge.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A check valve comprising:
   a housing;
   a flap;
   a hinge that allows the flap to rotate relative to the housing between a fully open position and a closed position;
   at least one post disposed at or near the periphery of the housing supporting the hinge and extending axially relative to the housing from the housing; and
   at least one tubular bumper movable with the flap and configured to contact the at least one post when the flap pivots to the fully open position;
   wherein the at least one post is rounded at a location where the at least one tubular bumper contacts the post when the flap is in the fully open position; and
   wherein the at least one tubular bumper has a cylindrical tubular shape, and is configured to flex upon impact with the at least one post.

2. The check valve of claim 1 and further comprising a second flap that rotates relative to the housing between a fully open and fully closed position.

3. The check valve of claim 2, wherein the flap and the second flap connect across a diameter of the housing to form the hinge.

4. A check valve comprising:
   a housing;
   a flap;
   a hinge that allows the flap to rotate relative to the housing between a fully open position and a closed position;
   at least one post disposed at or near the periphery of the housing supporting the hinge and extending axially relative to the housing from the housing; and
   at least one tubular bumper movable with the flap and configured to contact the at least one post when the flap pivots to the fully open position; and
   a second post disposed at or near the periphery of the check valve, diametrically opposite the at least one post, extending axially relative to the housing from the housing, the second post supporting the hinge.

5. The check valve of claim 4 and further comprising a second tubular bumper movable with the flap.

6. The check valve of claim 5, wherein the at least one tubular bumper contacts the at least one post and the second tubular bumper contacts the second post when the flap is in the fully open position.

7. The check valve of claim 6 and further comprising a second flap connected across a diameter of the housing.

8. The check valve of claim 7, and further comprising:
   a third tubular bumper movable with the second flap; and
   a fourth tubular bumper movable with the second flap.

9. The check valve of claim 8, wherein the at least one tubular bumper contacts the at least one post and the second tubular bumper contacts the second post when the flap is in the fully open position, and wherein the third tubular bumper contacts the at least one post and the fourth tubular bumper contacts the second post when the second flap is in the fully open position.

10. The check valve of claim 4, wherein the at least one tubular bumper extends across a surface of the flap so that the at least one tubular bumper contacts both the first and second post when the flap is in the fully open position.

11. The check valve of claim 10, and further comprising a second tubular bumper attached to the second flap, wherein the second tubular bumper extends across a surface of the second flap so that the second tubular bumper contacts both the first and second post when the second flap is in the fully open position.

12. The check valve of claim 4 and further comprising a stop connected to the at least one post and the second post, wherein the at least one tubular bumper contacts the stop when the flap is in the fully open position.

13. The check valve of claim 12, wherein the stop and the at least one tubular bumper are configured to distribute load caused by impact between the stop and the at least one tubular bumper.

14. The check valve of claim 12, wherein the stop is tubular.

15. The check valve of claim 14, wherein the at least one tubular bumper has a length of 5 to 100 percent of a length of the hinge.

16. The check valve of claim 14, wherein the at least one tubular bumper has a length of 10 to 45 percent of a length of the hinge.

17. A method of operating a check valve, the method comprising:

rotating a flap about a hinge and relative to a check valve housing in response to a fluid flow; and contacting at least a first post and a second post each extending axially relative to the housing from the housing and supporting the hinge, with at least one tubular bumper movable with the flap to stop rotation of the flap;

wherein the first post is disposed at or near the periphery of the housing; and wherein the second post is disposed at or near the periphery of the check valve, diametrically opposite the first post.

18. The method of claim 17 and further comprising:

distributing contact loads between the at least one tubular bumper and the first post or second post over 5 to 100 percent of a length of the hinge.

19. The method of claim 17 and further comprising:

distributing contact loads between the at least one tubular bumper and the first post or second post over 10 to 45 percent of a length of the hinge.

* * * * *